(12) United States Patent
Park et al.

(10) Patent No.: US 9,025,110 B2
(45) Date of Patent: May 5, 2015

(54) HORIZONTAL ELECTRIC FIELD-TYPE LIQUID CRYSTAL DISPLAY DEVICE AND METHOD OF FABRICATING THE SAME

(71) Applicants: LG Display Co., Ltd., Seoul (KR); Pusan National University Industry-University Cooperation Foundation, Busan (KR)

(72) Inventors: Sung-Il Park, Daegu (KR); Sung-Gu Kang, Gyeongsangbuk-do (KR); Yu-Ri Shim, Gyeongsangbuk-do (KR); Sun-Yong Lee, Gyeongsangbuk-do (KR); Tae-Hoon Yoon, Busan (KR); Byung-Wok Park, Busan (KR); Byeong-Hun Yu, Gyeongsangnam-do (KR); Dong-Han Song, Busan (KR); Sun-Wook Choi, Busan (KR)

(73) Assignees: LG Display Co., Ltd., Seoul (KR); Pusan National University Industry-University Cooperation Foundation, Busan (KR)

(\*) Notice: Subject to any disclaimer, the term of this patent is extended or adjusted under 35 U.S.C. 154(b) by 118 days.

(21) Appl. No.: 13/723,487

(22) Filed: Dec. 21, 2012

(65) Prior Publication Data
US 2014/0049731 A1 Feb. 20, 2014

(30) Foreign Application Priority Data
Aug. 20, 2012 (KR) .................. 10-2012-0090763

(51) Int. Cl.
| | | |
|---|---|---|
| *G02F 1/1334* | (2006.01) | |
| *G02F 1/1343* | (2006.01) | |
| *G02F 1/13* | (2006.01) | |
| *G02F 1/137* | (2006.01) | |

(52) U.S. Cl.
CPC ............ *G02F 1/1334* (2013.01); *G02F 1/1303* (2013.01); *G02F 1/134363* (2013.01); *G02F 2001/134372* (2013.01); *G02F 2001/13775* (2013.01)

(58) Field of Classification Search
CPC .............. G02F 1/1334; G02F 1/13436; G02F 2001/13775; G02F 2001/134381; G02F 2001/1343
USPC .......................................................... 349/88
See application file for complete search history.

(56) References Cited

U.S. PATENT DOCUMENTS

| | | | | |
|---|---|---|---|---|
| 7,633,588 | B2 * | 12/2009 | Lin et al. ................ | 349/141 |
| 2007/0126969 | A1 * | 6/2007 | Kimura et al. ............ | 349/141 |
| 2007/0284627 | A1 * | 12/2007 | Kimura ................ | 257/257 |

FOREIGN PATENT DOCUMENTS

| | | |
|---|---|---|
| JP | 10-048602 A | 2/1998 |
| KR | 10-2010-0069431 | 6/2010 |
| KR | 10-2012-0080370 | 7/2012 |

OTHER PUBLICATIONS

Korean Office Action dated Sep. 13, 2013 for corresponding Korean Patent Application No. 10-2012-0090763.

*Primary Examiner* — Shean C Wu
(74) *Attorney, Agent, or Firm* — Morgan, Lewis & Bockius LLP

(57) ABSTRACT

A horizontal electric field-type liquid crystal display (LCD) device is provided. The LCD device includes first and second substrates disposed opposite and apart from each other, a first electrode formed on an inner surface of the first substrate, a second electrode corresponding to the first electrode and configured to generate an electric field, and a liquid crystal (LC) layer formed between the first and second substrates, the LC layer including a polymer network and LC molecules confined in multiple domains by the polymer network.

8 Claims, 18 Drawing Sheets

HORIZONTAL ELECTRIC FIELD-TYPE LIQUID CRYSTAL DISPLAY DEVICE AND METHOD OF FABRICATING THE SAME

The present application claims the priority benefit of Korean Patent Application No. 10-2012-0090763 filed in the Republic of Korea on Aug. 20, 2012, which is hereby incorporated by reference in its entirety.

BACKGROUND

1. Field of the Disclosure

The present disclosure relates to a liquid crystal display (LCD) device, and more particularly, to a horizontal electric field-type LCD device including a polymer network formed using a reactive material and a method of fabricating the same.

2. Discussion of the Related Art

In general, a liquid crystal display (LCD) device may be driven based on optical anisotropy and polarization of liquid crystals (LCs). Since LC molecules are thin and long, the LC molecules may be arranged in a specific direction, and a direction in which the LC molecules are arranged may be controlled by artificially applying an electric field to LCs.

That is, when the arrangement of the LC molecules is changed using an electric field, light may be refracted due to the optical anisotropy of the LCs in the direction in which the LC molecules are arranged, so that images can be displayed.

In recent years, an active-matrix LCD (AM-LCD) device in which TFTs and pixel electrodes are arranged in matrix shapes has attracted much attention because the device has a high resolution and is highly capable of embodying moving images.

A typical twisted-nematic (TN)-mode LCD may include an array substrate having pixel electrodes, a color filter substrate having common electrodes, and an LC layer interposed between the array substrate and the color filter substrate. In the TN-mode LCD device, the LC layer may be driven due to a vertical electric field generated by the common electrodes and the pixel electrodes. Also, the TN-mode LCD device may have a high transmittance and a high aperture ratio.

However, the LCD device in which the LC layer is driven due to the vertical electric field may have poor viewing angle characteristics.

To overcome the disadvantages of the TN-mode LCD device, a horizontal electric field-type LCD device having good viewing angle characteristics, such as a fringe-field switching (FFS)-mode LCD device or an in-plane switching (IPS)-mode LCD device, has been proposed. An FFS-mode LCD device will now be described with reference to FIG. 1 as an example of the horizontal electric field-type LCD device.

FIG. 1 is a cross-sectional view of a conventional FFS-mode LCD device 10.

Referring to FIG. 1, the FFS-mode LCD device 10 may include first and second substrates 20 and 30 disposed opposite and apart from each other and an LC layer 70 interposed between the first and second substrates 20 and 30.

A first electrode 40 having a plate shape may be formed on an inner surface of the first substrate 20, and an insulating layer 42 may be formed on the first electrode 40.

A plurality of second electrodes 50 having bar shapes may be formed on the insulating layer 42 and spaced apart from one another. A first alignment layer 60 may be formed on the plurality of second electrodes 50.

In addition, a second alignment layer 62 may be formed on an inner surface of the second substrate 20.

The LC layer 70 may be formed between the first and second alignment layers 60 and 62. Major axes of LC molecules 72 of the LC layer 70 may be horizontally arranged parallel to the first and second substrates 20 and 30.

When different voltages are applied to the first and second electrodes 40 and 50, an electric field may be generated between the first and second electrodes 40 and 50. The LC molecules 72 of the LC layer 70 may rotate on a horizontal plane surface due to the electric field and be rearranged to display an image.

In the FFS-mode LCD device 10, since the LC molecules 72 of the LC layer 70 are always rearranged on the plane surface parallel to the first and second substrates 20 and 30, viewing angles may be improved in vertical and lateral directions on the basis of a front surface of the LCD device 10.

However, unlike a conventional vertical electric field-type LCD device, in a conventional horizontal electric field-type LCD device, a strong electric field may be generated only in a region adjacent to an electrode disposed on an inner surface of a first substrate, and a weak electric field may be generated in a region adjacent to a second substrate. Thus, LC molecules present in the region adjacent to the second substrate may be driven more slowly than LC molecules present in the region adjacent to the first substrate.

Furthermore, since the rotational viscosity of LC molecules of an LC layer increases with a drop in ambient temperature, as an ambient temperature decreases, an LC response time of a conventional horizontal electric field-type LCD device may increase, and a response speed thereof may be reduced.

SUMMARY OF THE INVENTION

Accordingly, the present invention is directed to a horizontal electric field-type liquid crystal display (LCD) device and a method of fabricating the same that substantially obviate one or more of the problems due to limitations and disadvantages of the related art.

An object of the present disclosure is to provide a horizontal electric field-type LCD device and a method of fabricating the same, in which a polymer network is formed in an LC layer by curing a reactive material so that a response time and response speed can be improved at room temperature and low temperatures.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a horizontal electric field-type LCD device includes: first and second substrates disposed opposite and apart from each other; a first electrode formed on an inner surface of the first substrate; a second electrode corresponding to the first electrode and configured to generate an electric field; and a liquid crystal (LC) layer formed between the first and second substrates, the LC layer including a polymer network and LC molecules confined in multiple domains by the polymer network.

The polymer network may be formed by curing a reactive material.

The reactive material may be a reactive mesogen or a reactive monomer.

In another aspect, a method of fabricating a horizontal electric field-type LCD device includes: forming a first electrode and a second electrode on a first substrate, the second electrode corresponding to the first electrode and configured to generate an electric field; bonding the first and second substrates to each other; forming a liquid crystal (LC) layer between the first and second substrates using a composition including an LC material and a reactive material; and forming a polymer network in the LC layer by curing the reactive material.

The reactive material may be contained at a content of about 0.1% or more by weight.

The reactive material may be a reactive mesogen or a reactive monomer.

The reactive material may have positive A (+A)-type or positive C (+C)-type refractive index characteristics.

The formation of the polymer network may include irradiating ultraviolet (UV) light to the reactive material.

The UV light may have a power density of about 1 mW/cm$^2$ or more.

During the formation of the polymer network, the same voltage may be applied to the first and second electrodes, or the first and second electrodes may be electrically floated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments, examples of which are illustrated in the accompanying drawings.

A horizontal electric field-type liquid crystal display (LCD) device and a method of fabricating the same according to the present invention will now be described with reference to the accompanying drawings, in which embodiments of the present invention are shown. Hereinafter, a fringe-field switching (FFS)-mode LCD device will be described as an example.

Figure 1:
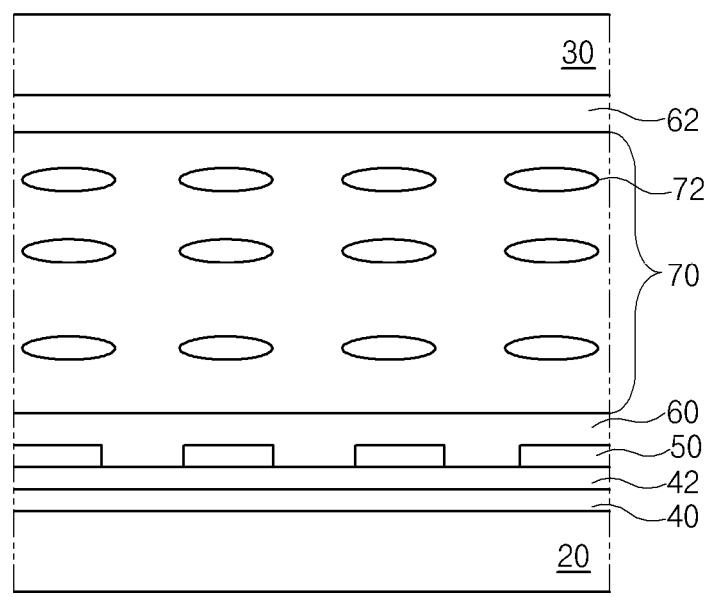
FIG. 1 is a cross-sectional view of a conventional fringe-field switching (FFS)-mode liquid crystal display (LCD) device.
Figure 2:
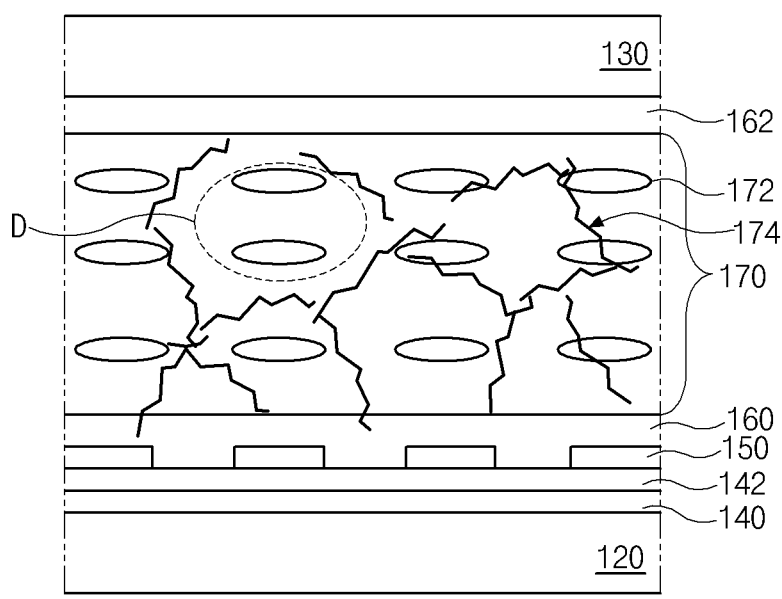
FIG. 2 is diagram showing construction of a horizontal electric field-type LCD device according to an embodiment of the present invention.

FIG. 2 is a diagram showing construction of a horizontal electric field-type LCD device 110 according to an embodiment of the present invention.

Referring to FIG. 2, the LCD device 110 according to the embodiment of the present invention may include first and second substrates 120 and 130 disposed opposite and apart from each other and a liquid crystal (LC) layer 170 interposed between the first and second substrates 120 and 130.

A first electrode 140 having a plate shape may be formed in pixel regions disposed on an inner surface of the first substrate 120. An insulating layer 142 may be formed on the first electrode 140.

A plurality of second electrodes 150 having bar shapes may be formed on the insulating layer 142 and spaced apart from one another, and a first alignment layer 160 may be formed on the plurality of second electrodes 150.

The first substrate 120 may include a plurality of pixel regions (not shown). Gate lines (not shown) and data lines (not shown) may be formed on the inner surface of the first substrate 120 and cross each other to define the plurality of pixel regions. Thin film transistors (TFTs) may be connected to the gate lines and the data lines.

Each of the TFTs may include a gate electrode formed on the first substrate 120 and connected to the gate line, a gate insulating layer formed on the gate electrode, a semiconductor layer formed on the gate insulating layer, a source electrode formed on the semiconductor layer and connected to the data line, and a drain electrode formed on the semiconductor layer and formed opposite and apart from the source electrode.

One of the first and second electrodes 140 and 150 may serve as a pixel electrode connected to the drain electrode of the TFT and configured to receive a data voltage, and the other thereof may serve as a common electrode configured to receive a common voltage.

Also, a second alignment layer 162 may be formed on an inner surface of the second substrate 120.

An LC layer 170 may be formed between the first and second alignment layers 160 and 162. The LC layer 170 may include LC molecules 172 and a polymer network 174.

The LC molecules 172 may be horizontally arranged such that major axes of the LC molecules 172 are parallel to the first and second substrates 120 and 130.

The polymer network 174 may be formed by curing a reactive material. The LC molecules 172 may be divided into multiple domains by the polymer network 174 having a net shape.

A method of fabricating a horizontal electric field-type LCD device will now be described with reference to FIGS. 3A through 3C.

Figure 3A:
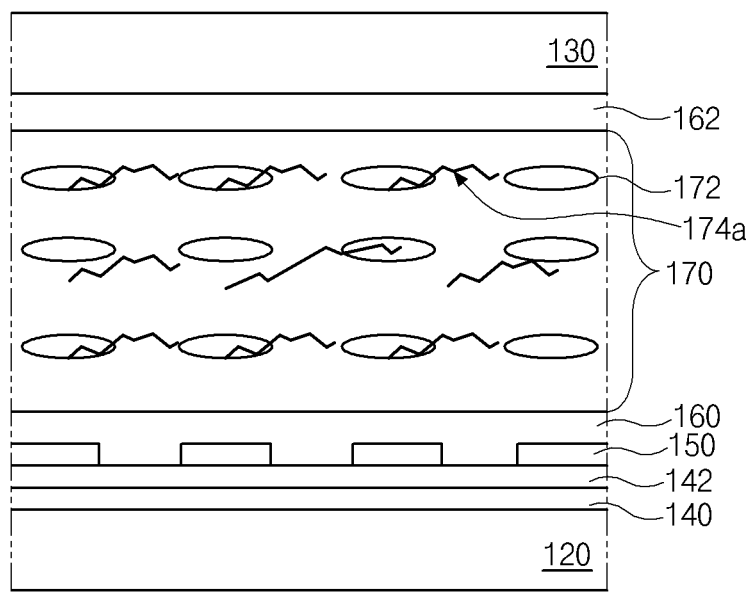
FIGS. 3A through 3C are diagrams illustrating a method of fabricating a horizontal electric field-type LCD device according to an embodiment of the present invention.
Figure 3B:
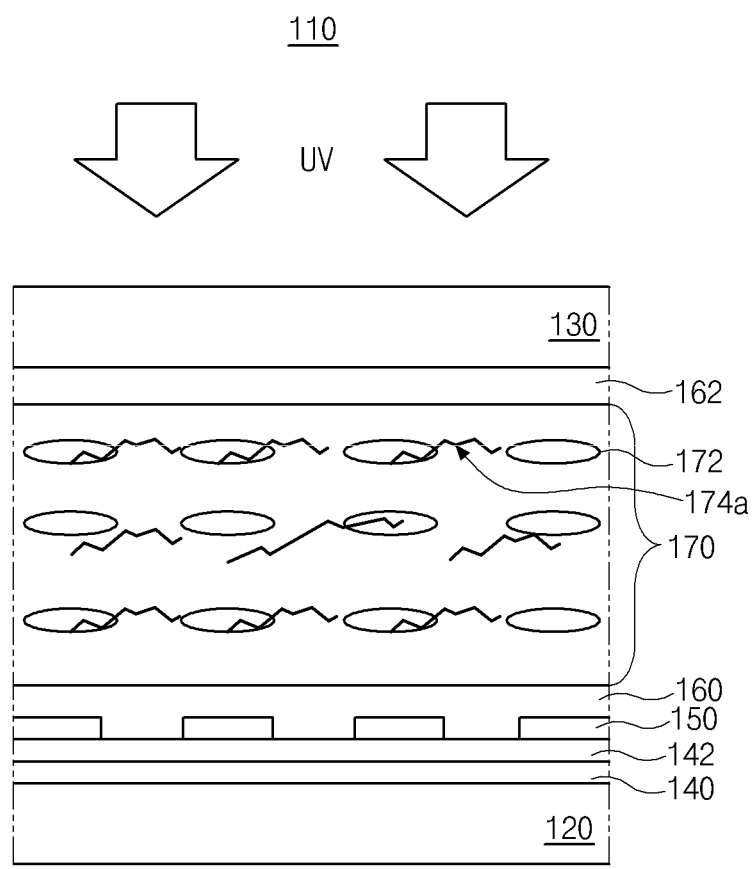
Figure 3C:
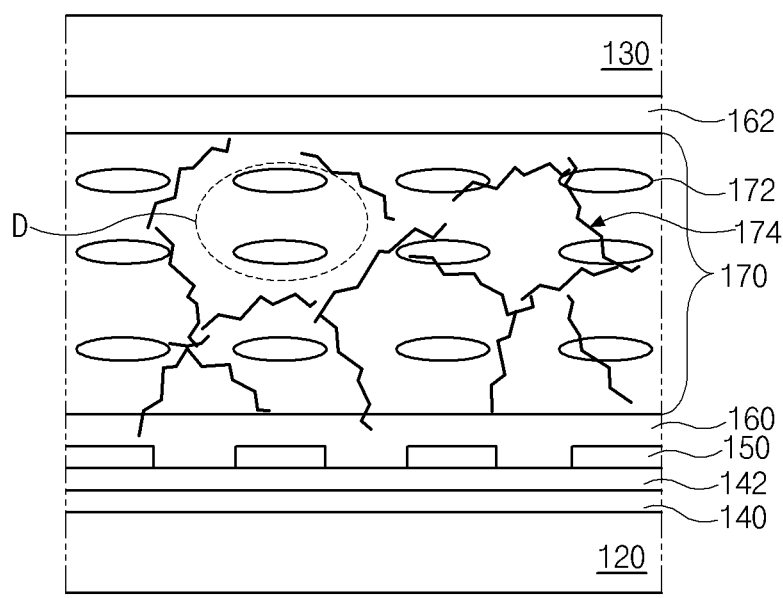

FIGS. 3A through 3C are diagrams illustrating a method of fabricating a horizontal electric field-type LCD device according to an embodiment of the present invention.

Referring to FIG. 3A, gate lines, data lines, TFTs, a first electrode 140, an insulating layer 142, a plurality of second electrodes 150, and a first alignment layer 160 may be formed on a first substrate 120 having a plurality of pixel regions, a second alignment layer 162 may be formed on a second substrate 130, and the first and second substrates 120 and 130 may be bonded to each other such that the first and second alignment layers 160 and 162 are disposed opposite and apart from each other.

In addition, an LC layer 170 may be formed between the first and second substrates 120 and 130 using an injection process or a dropping process.

The LC layer 170 may be formed using a composition containing an LC material and a reactive material 174a. The reactive material 174a may be contained at a content of about 0.1% or more by weight, for example, about 0.1 to 10% by weight, based on the total weight of the composition.

Furthermore, the reactive material 174a may be a photo-reactive material that may have a photo-reactive functional group on at least one end of its molecule and be cured by light, such as ultraviolet (UV) light. For example, the reactive material 174a may be a reactive mesogen (RM) or a reactive monomer.

The reactive material 174a may have positive A (+A)-type or positive C (+C)-type refractive index characteristics.

For example, assuming that the reactive material 174a is present on an xy plane of an xyz coordinate system, an x axis and a y axis refer to plane directions of the reactive material 174a, a z axis refers to a thickness direction thereof, and the reactive material 174a may have refractive indices of nx, ny, and nz along the x, y, and z axes, respectively.

Also, a phase difference obtained in the plane direction (x-axis direction or y-axis direction) of the reactive material 174a may be indicated by Rin (here, "in" refers to in-plane) and defined as (nx−ny), and a phase difference obtained in the thickness direction (z-axis direction) of the reactive material 174a may be denoted by Rth (here, "th" refers to thickness) and defined as (nz−nx) or (nz−ny).

Here, a +A type and a −A type may satisfy relationships: (nx>ny=nz) and (nx<ny=nz), respectively, and a +C type and a −C type may satisfy relationships: (nz>nx=ny) and (nz<nx=ny), respectively.

Accordingly, the +A-type reactive material 174a may have refractive index characteristics of (nx>ny=nz), and the +C-type reactive material 174a may have refractive index characteristics of (nz>nx=ny).

In the above-described LC layer 170, the LC molecules 172 and the reactive material 174a may be arbitrarily mixed and scattered.

As shown in FIG. 3B, UV light may be irradiated from an outer surface of the second substrate 130 of the bonded first and second substrates 120 and 130 to the LC layer 170 to cure the reactive material 174a of the LC layer 170.

During the curing process with the UV irradiation, a vertical electric field or horizontal electric field may not be applied to the LC layer 170, and different voltages may not be applied to the first and second electrodes 140 and 150.

For instance, during the UV irradiation, the same voltage may be applied to the first and second electrodes 140 and 150, or the first and second electrodes 140 and 150 may be electrically floated.

The UV light used to cure the reactive material 174a may have a power density of about 1 mW/cm$^2$ or more, for example, about 1 mW/cm$^2$ to 45000 mW/cm$^2$. A time for which UV light is irradiated may be controlled such that the UV light irradiated to the reactive material 174a has an energy density of about 3 J/cm$^2$ or more.

As shown in FIG. 3C, photo-reactive functional groups of adjacent reactive materials 174a may be bonded to each other due to UV light and polymerized to form a polymer network 174 having a net shape.

Thus, the LC molecules 172 may be confined and arranged in multiple domains D defined by the polymer network 174.

In the horizontal electric field-type LCD device 110, when different voltages are applied to the first and second electrodes 140 and 150, an electric field may be generated between the first and second electrodes 140 and 150, and the LC molecules 172 of the LC layer 170 may rotate on a horizontal plane surface parallel to the first and second substrates 120 and 130 due to the electric field and be rearranged to display images.

Here, since the LC molecules 172 of the LC layer 170 always rotate and are arranged on the horizontal plane surface parallel to the first and second substrates 120 and 130, viewing angles may be improved in vertical and lateral directions on the basis of a front surface of the horizontal electric field-type LCD device 110.

Furthermore, since the LC molecules 172 of the LC layer 170 are confined and rearranged in the multiple domains D by the polymer network 174, cell gaps may be substantially reduced as compared with a case in which the LC molecules 172 are rearranged on the entire LC layer 170. As a result, a response time and response speed of the LC layer 170 may be improved at room temperature and low temperatures.

An improvement in the response time of the LC layer 170 will now be described.

Figure 4:
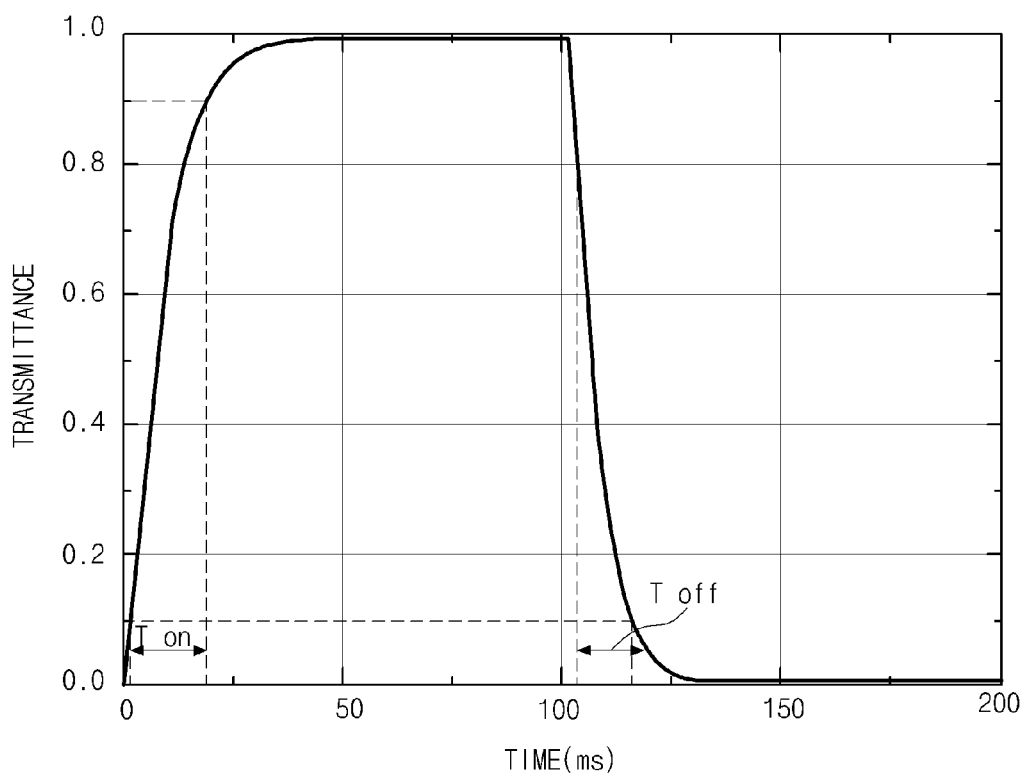
FIG. 4 is a graph showing a response time of a horizontal electric field-type LCD device according to an embodiment of the present invention.
Figure 5A:
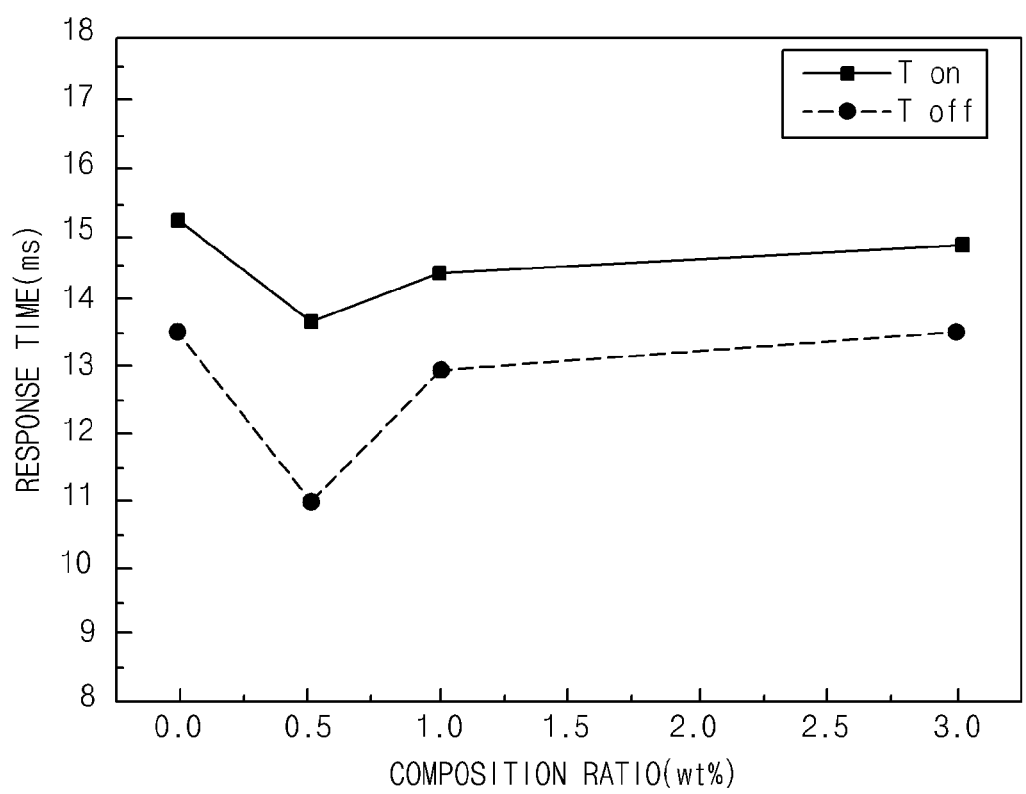
FIGS. 5A through 5D are graphs showing a response time (ms) relative to a content (wt %) at ambient temperatures of about 20° C. (room temperature), about 10° C., 0° C., and −10° C., respectively, in a horizontal electric field-type LCD device according to an embodiment of the present invention, in which a polymer network was formed using a positive C (+C)-type reactive material.
Figure 5B:
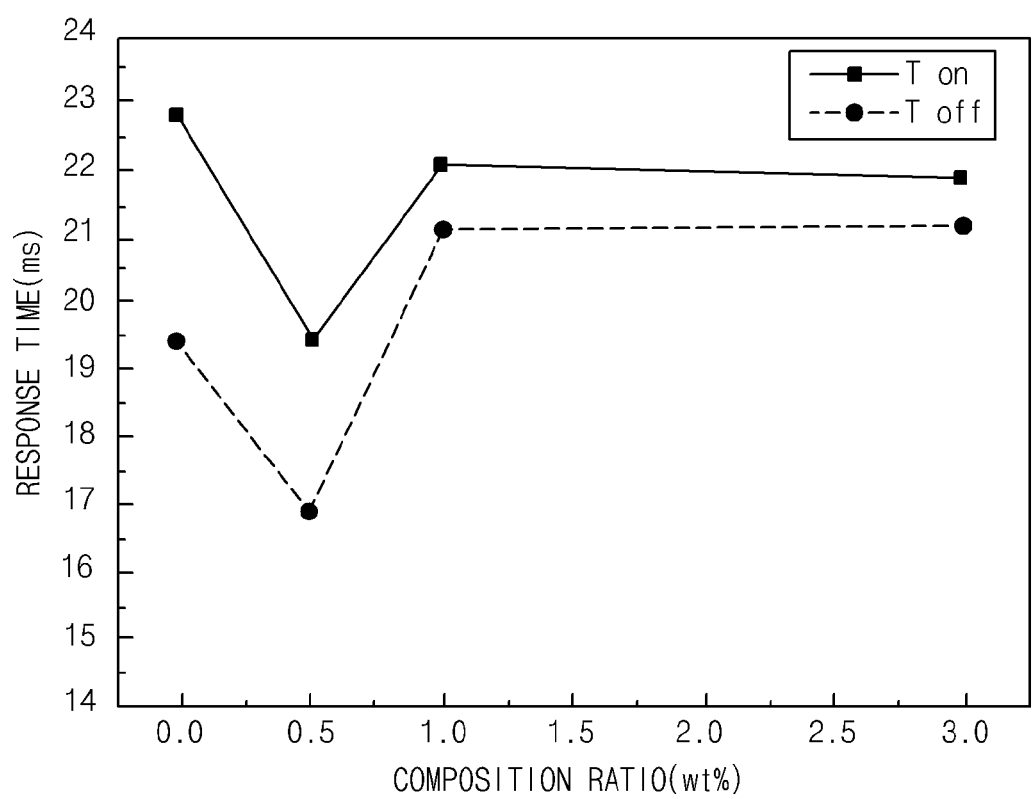
Figure 5C:
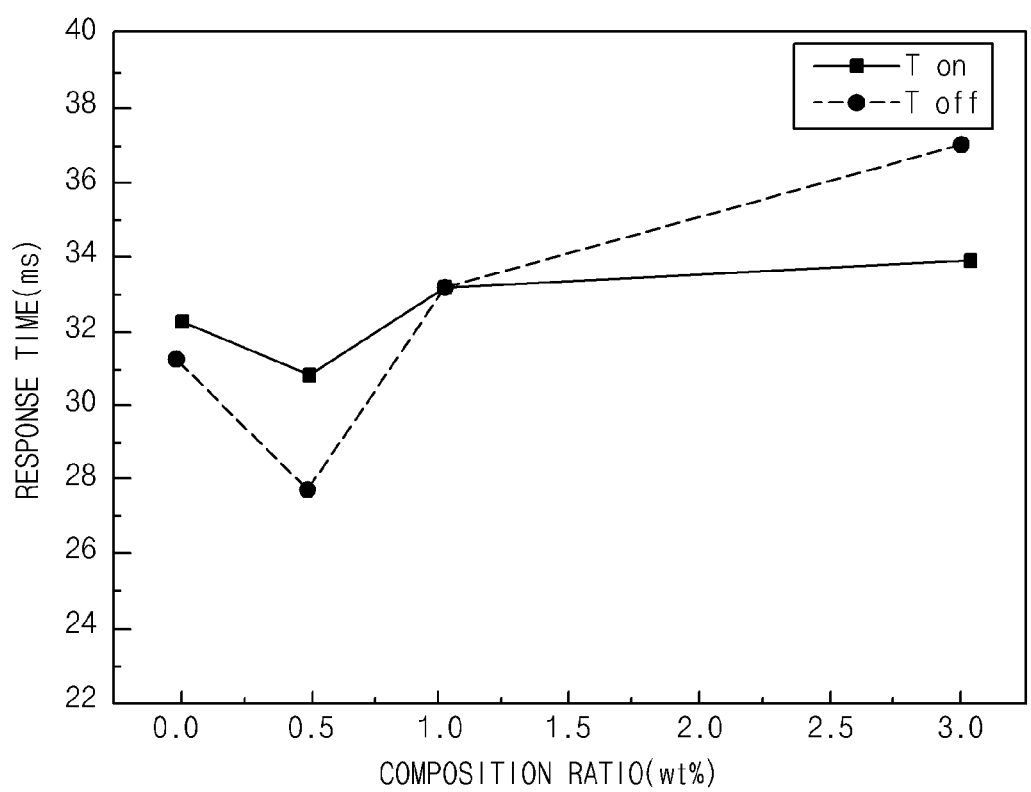
Figure 5D:
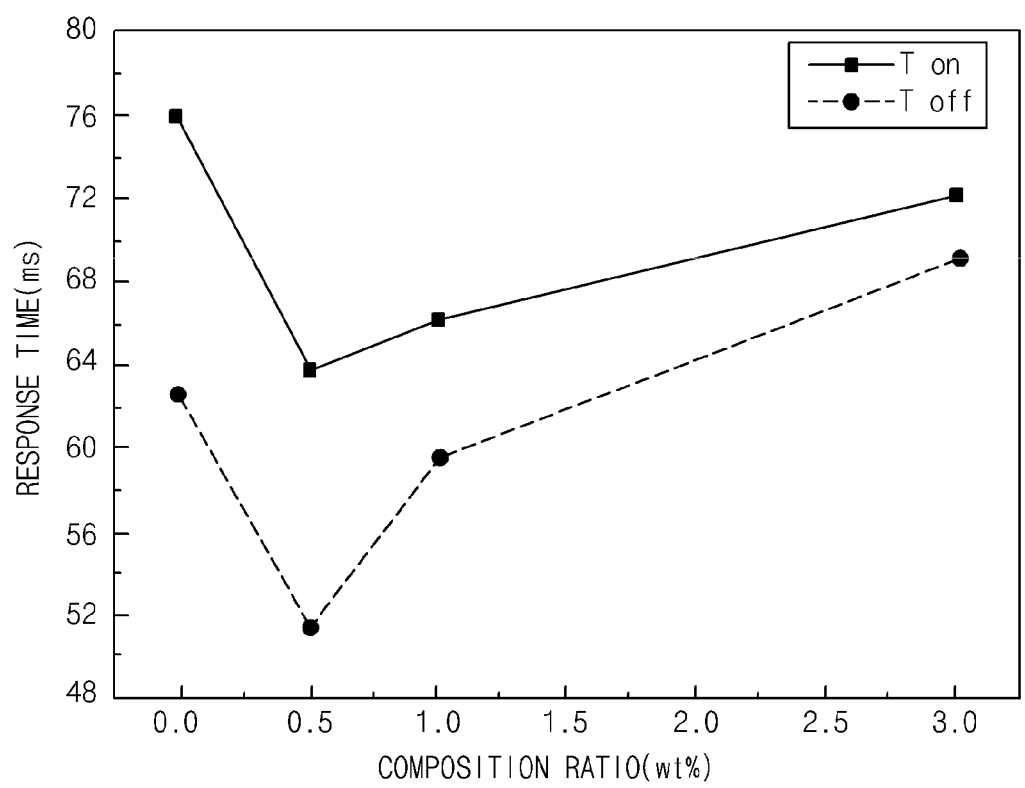
Figure 6A:
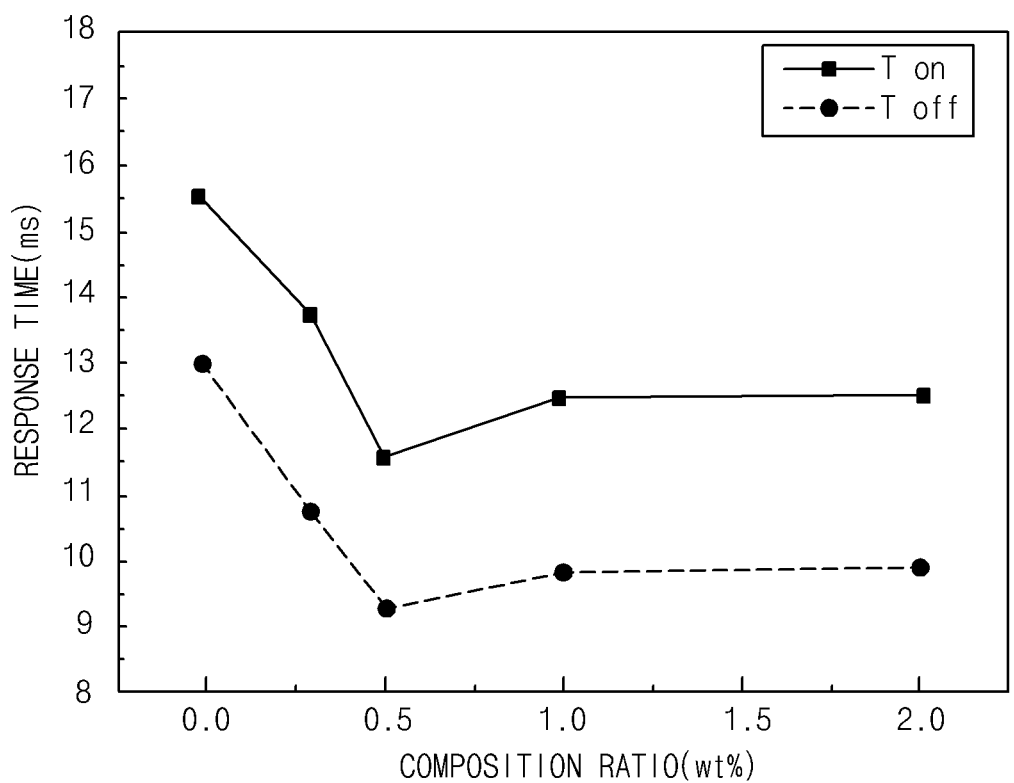
FIGS. 6A through 6D are graphs showing a response time (ms) relative to a content (wt %) at ambient temperatures of about 20° C. (room temperature), about 10° C., 0° C., and −10° C., respectively, in a horizontal electric field-type LCD device according to an embodiment of the present invention, in which a polymer network was formed using a positive A (+A)-type reactive material.
Figure 6B:
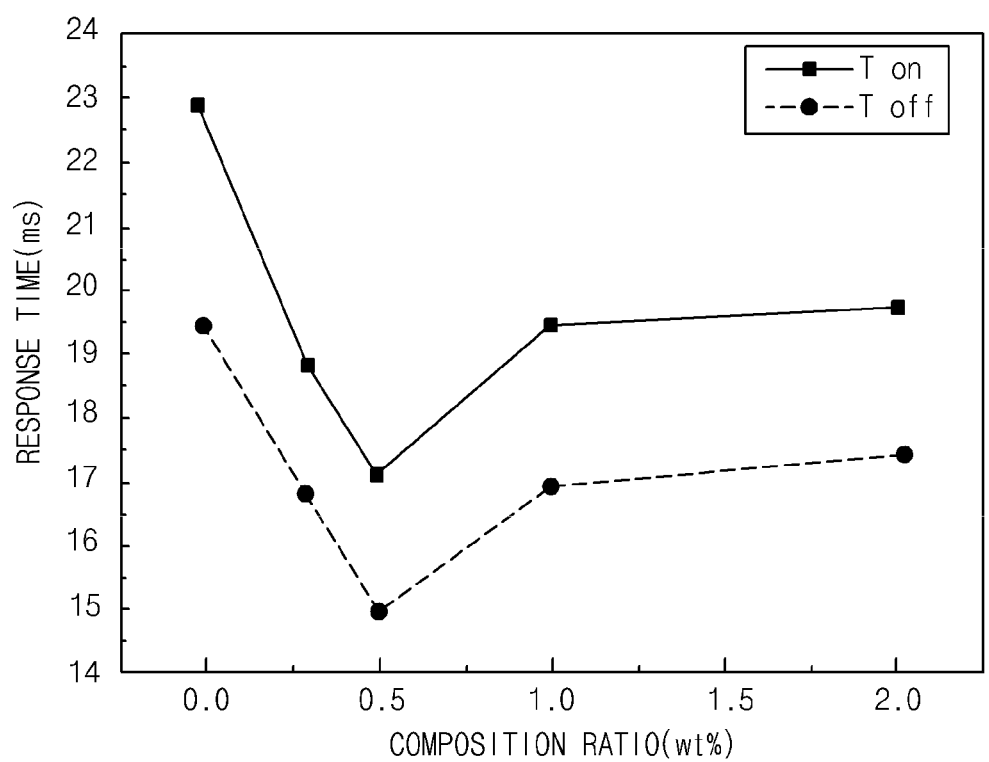
Figure 6C:
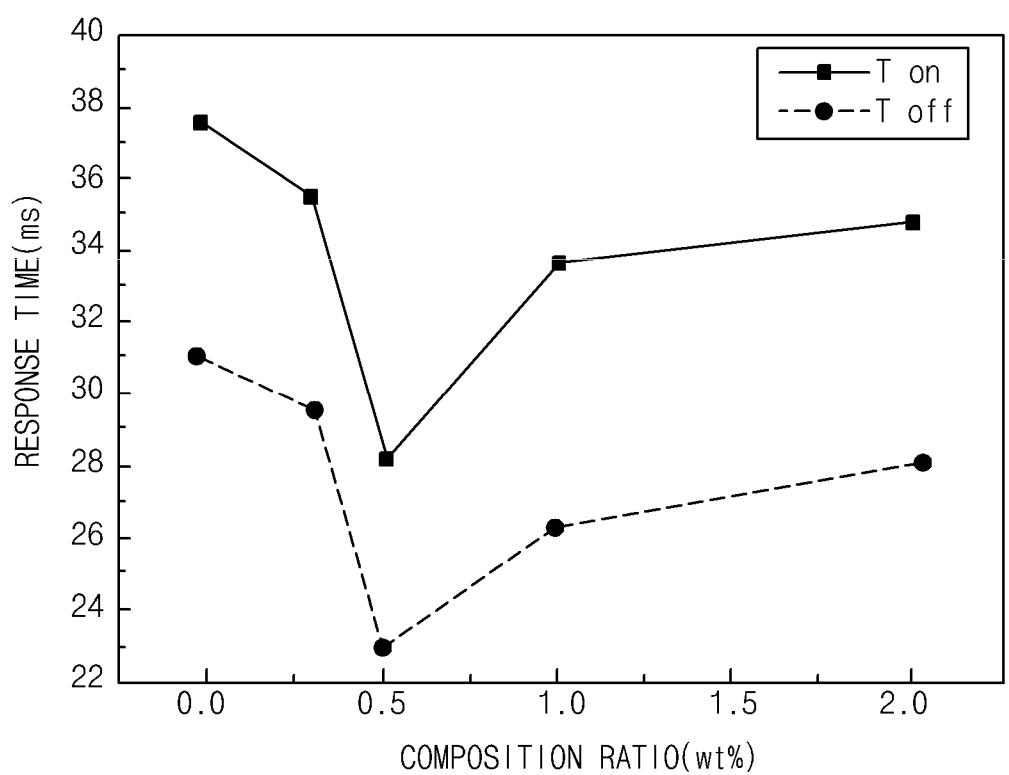
Figure 6D:
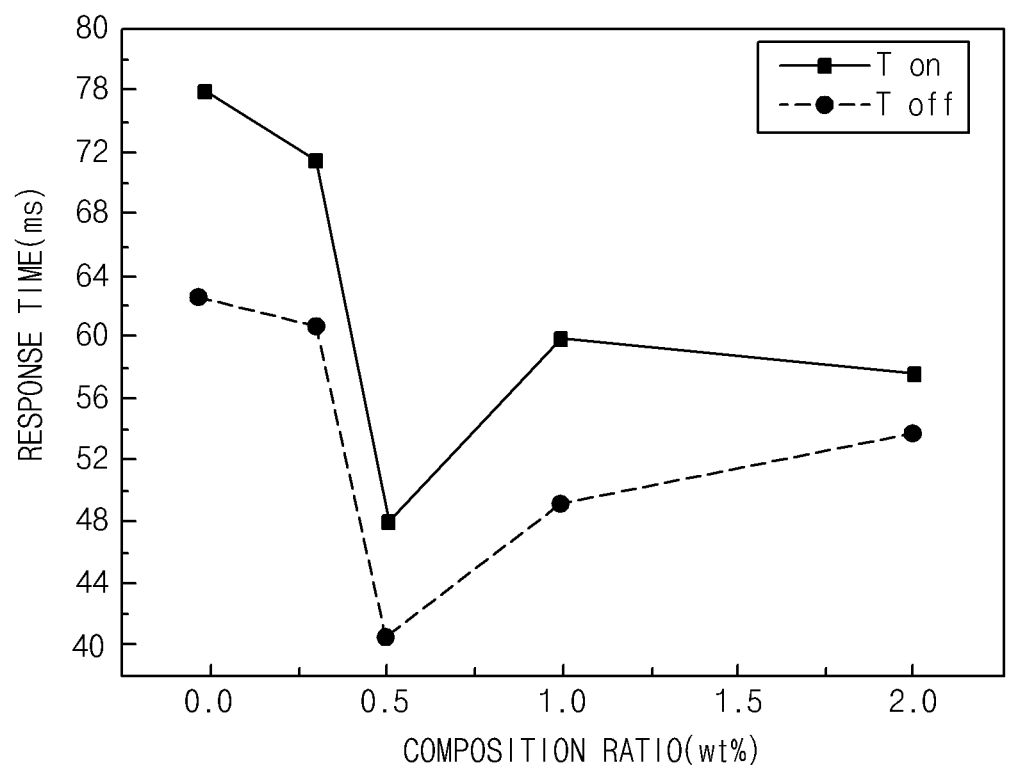
Figure 7A:
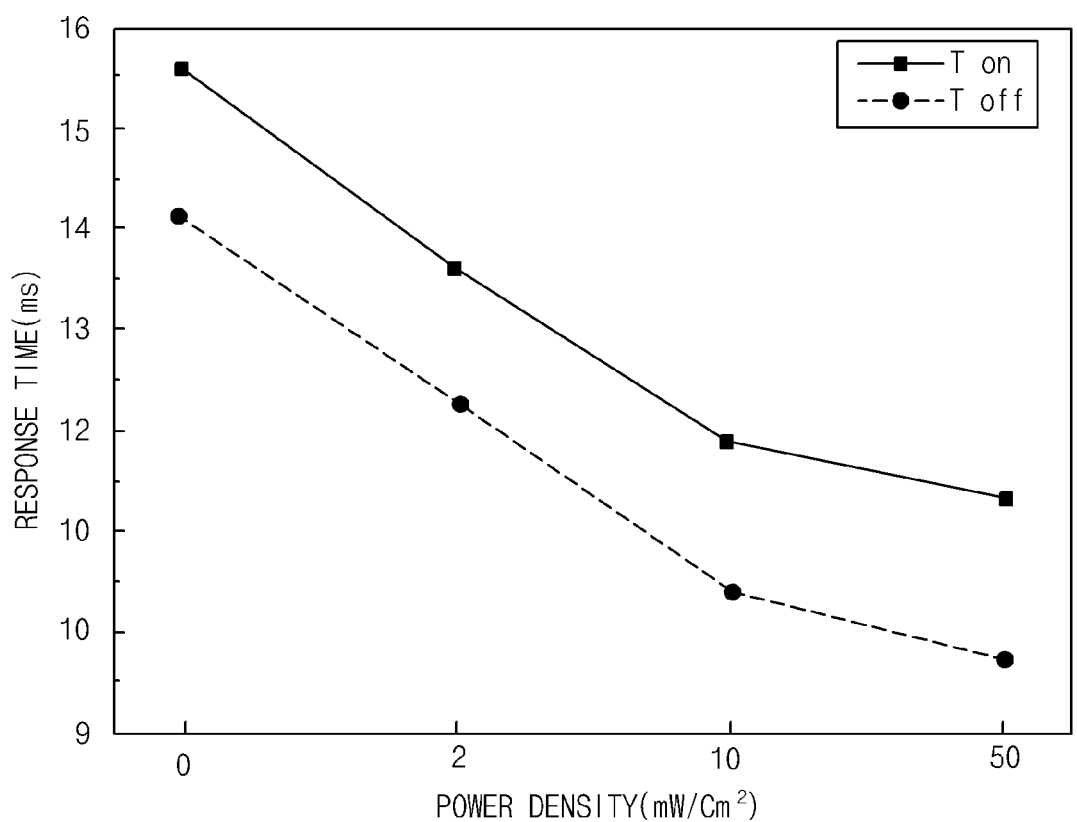
FIGS. 7A through 7D are graphs showing a response time (ms) relative to a power density of UV light at ambient temperatures of about 20° C. (room temperature), about 10° C., 0° C., and −10° C., respectively, in a horizontal electric field-type LCD device according to an embodiment of the present invention, in which a polymer network was formed of about 0.5% by weight positive A (+A)-type reactive material.
Figure 7B:
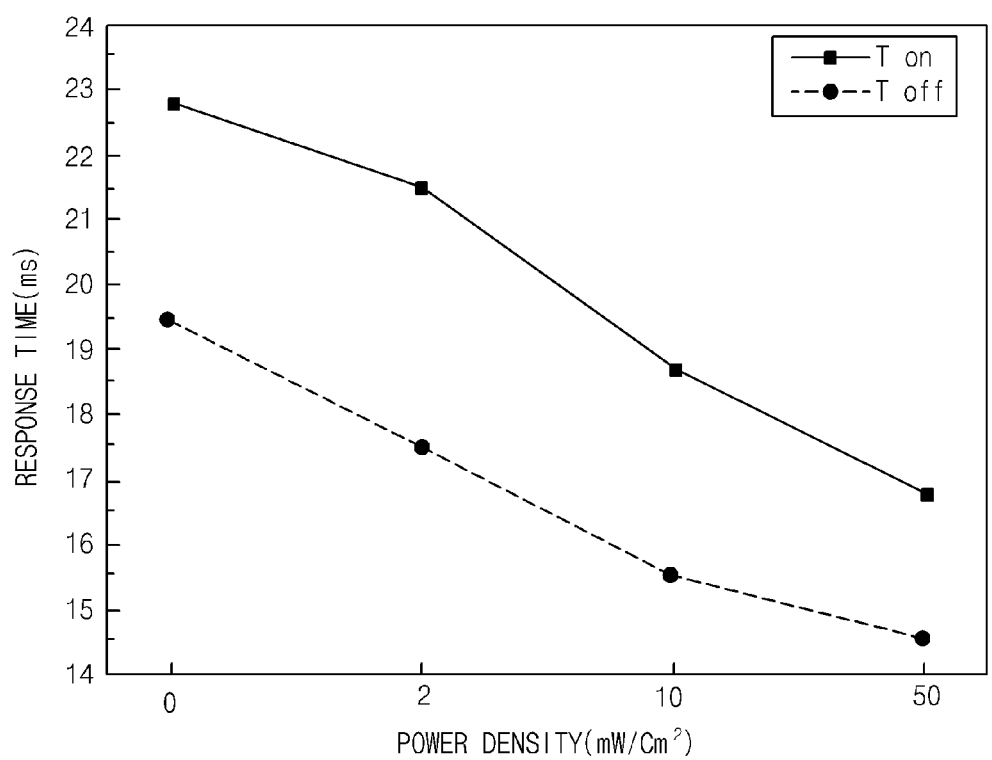
Figure 7C:
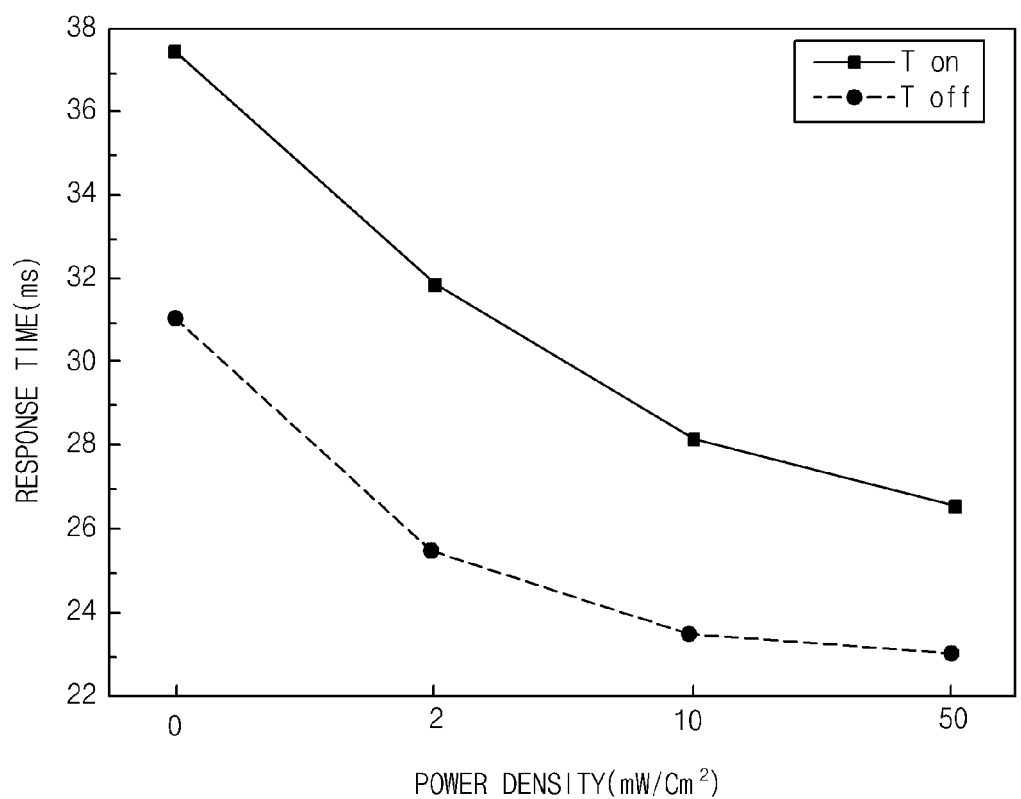
Figure 7D:
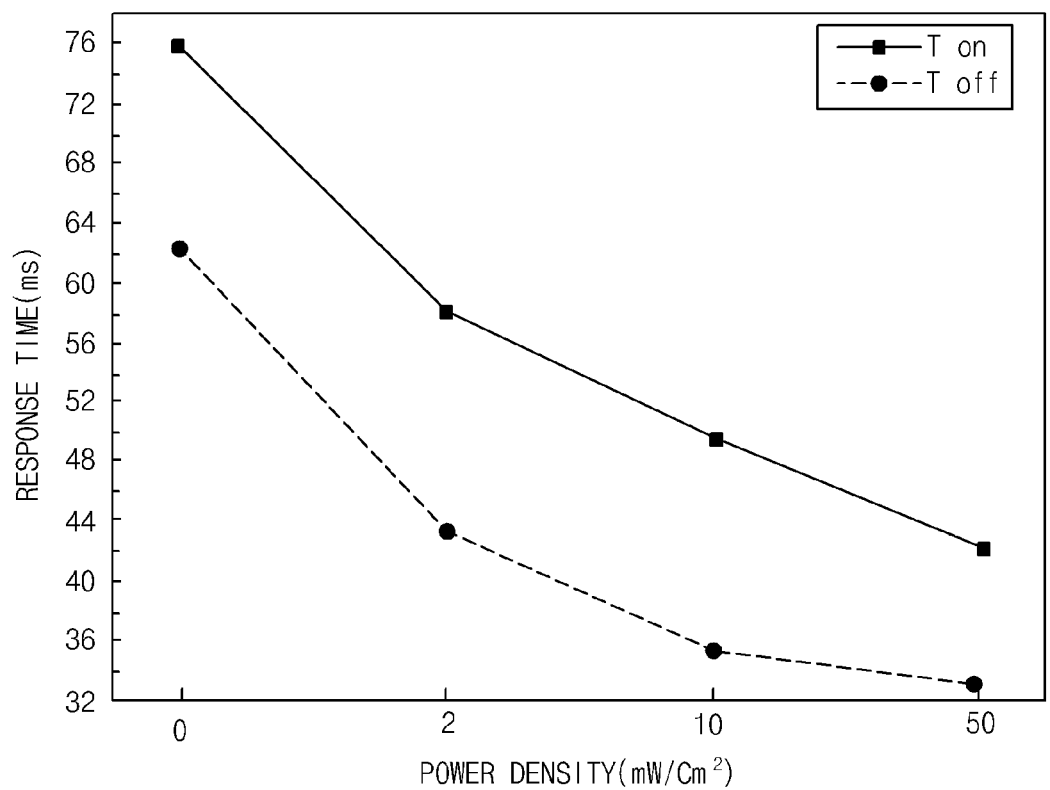

FIG. 4 is a graph showing a response time of a horizontal electric field-type LCD device according to an embodiment of the present invention.

Referring to FIG. 4, when different voltages are applied to first and second electrodes (refer to 140 and 150 in FIG. 2) of the horizontal electric field-type LCD device and eliminated, a transmittance of the horizontal electric field-type LCD device increases from 0 to 1 and then decreases to 0.

In this case, the transmittance varies from 0 to 1 with a predetermined rising delay time with respect to a voltage application time point (0 ms), and the transmittance varies from 1 to 0 with a falling delay time with respect to a voltage elimination time point (100 ms). A time taken to vary the transmittance from 0.1 (10% of the maximum value) to 0.9 (90% of the maximum value) and a time taken to vary the transmittance from 0.9 to 0.1 may be defined as an on response time (Ton) and an off response time (Toff), respectively.

FIGS. 5A through 5D are graphs showing a response time (ms) relative to a content (wt %) at ambient temperatures of about 20° C. (room temperature), about 10° C., 0° C., and −10° C., respectively, in a horizontal electric field-type LCD device according to an embodiment of the present invention, in which a polymer network was formed using a positive C (+C)-type reactive material.

In FIGS. 5A through 5D, a case in which a content is 0% by weight denotes data regarding a conventional horizontal electric field-type LCD device in which no reactive material was added. UV light used to cure the reactive material had a power density of about 10 mW/cm$^2$ and was irradiated for about 10 minutes.

In addition, a liquid crystal for an automobile having a wide temperature range was used as an LC material, PI-PAA hybrid type PI was used as each of first and second alignment layers.

As shown in FIGS. 5A through 5D, as compared with the conventional horizontal electric field-type LCD device, in the horizontal electric field-type LCD device using the +C-type reactive material according to the embodiment of the present invention, it can be seen that on and off response times were improved at each of the ambient temperatures of about 20° C., about 10° C., 0° C., and −10° C.

In particular, as compared with the conventional horizontal electric field-type LCD device, when the +C-type reactive material was contained at a content of about 0.5% by weight, the on and off response times were reduced by as much as about 10% and about 19%, respectively, at the ambient temperature of about 20° C., reduced by as much as about 9% and 12%, respectively, at the ambient temperature of about 10° C., reduced by as much as about 5% and 15%, respectively, at the ambient temperature of about 0° C., and reduced by as much as about 16% and 17%, respectively at the ambient temperature of about −10° C.

FIGS. 6A through 6D are graphs showing a response time (ms) relative to a content (wt %) at ambient temperatures of about 20° C. (room temperature), 10° C., 0° C., and −10° C., respectively, in a horizontal electric field-type LCD device according to an embodiment of the present invention, in which a polymer network was formed using a positive A (+A)-type reactive material.

In FIGS. 6A through 6D, a case in which a content is 0% by weight denotes data regarding a conventional horizontal electric field-type LCD device in which no reactive material was added. UV light used to cure the reactive material had a power density of about 50 mW/cm$^2$ and was irradiated for about 2 minutes.

In addition, a liquid crystal for an automobile having a wide temperature range was used as an LC material, PI-PAA hybrid type PI was used as each of first and second alignment layers.

As shown in FIGS. 6A through 6D, as compared with the conventional horizontal electric field-type LCD device, in the horizontal electric field-type LCD device using the +A-type reactive material according to the embodiment of the present invention, it can be seen that on and off response times were improved at each of the ambient temperatures of about 20° C., 10° C., 0° C., and −10° C.

In particular, as compared with the conventional horizontal electric field-type LCD device, when the +A-type reactive material was contained at a content of about 0.5% by weight, the on and off response times were reduced by as much as about 28% and about 32%, respectively, at the ambient temperature of about 20° C., reduced by as much as about 27% and 26%, respectively, at the ambient temperature of about 10° C., reduced by as much as about 30% and 27%, respectively, at the ambient temperature of about 0° C., and reduced by as much as about 44% and 47%, respectively, at the ambient temperature of about −10° C.

FIGS. 7A through 7D are graphs showing a response time (ms) relative to a power density of UV light at ambient temperatures of about 20° C. (room temperature), 10° C., 0° C., and −10° C., respectively, in a horizontal electric field-type LCD device according to an embodiment of the present invention, in which a polymer network was formed of about 0.5% by weight positive A (+A)-type reactive material. A case in which UV light had a power density of about 0 mW/cm$^2$ denotes data regarding a conventional horizontal electric field-type LCD device in which UV light was not irradiated.

In addition, a liquid crystal for an automobile having a wide temperature range was used as an LC material, PI-PAA hybrid type PI was used as each of first and second alignment layers.

As shown in FIGS. 7A through 7D, as compared with the conventional horizontal electric field-type LCD device, in the horizontal electric field-type LCD device using about 0.5% by weight +A-type reactive material according to the embodiment of the present invention, it can be seen that on and off response times were improved at each of the ambient temperatures of about 20° C., 10° C., 0° C., and −10° C.

In particular, as compared with the conventional horizontal electric field-type LCD device, when the UV light had a power density of about 50 mW/cm$^2$ and was irradiated for about 2 minutes, the on and off response times were reduced by as much as about 28% and about 32%, respectively, at the ambient temperature of about 20° C., reduced by as much as about 27% and 26%, respectively, at the ambient temperature of about 10° C., reduced by as much as about 30% and 27%, respectively, at the ambient temperature of about 0° C., and reduced by as much as about 44% and 47%, respectively, at the ambient temperature of about −10° C.

In the horizontal electric field-type LCD device according to the embodiments of the present invention, multiple domains may be formed by a polymer network formed by curing a reactive material, and LC molecules may be confined in the multiple domains and rearranged. Thus, the same effects may be produced as when a cell gap, which corresponds to a space in which the LC molecules are driven, is reduced. As a result, a response time and a response speed may be improved.

An on response time and an off response time may be expressed by Equations (1) and (2), respectively. Since a cell gap d is reduced, the on response time and the off response time may be reduced to improve a response time.

$$\tau_{on} = \frac{\gamma_1 d^2}{K_{22}\pi^2} \cdot \frac{1}{\left(\frac{V}{V_{th}}\right)^2 - 1}, \tag{1}$$

and $$\tau_{off} = \frac{\gamma_1 d^2}{K_{22}\pi^2}. \tag{2}$$

When an LC layer of a horizontal electric field-type LCD device in which a polymer network was formed using a +C-type reactive material and an LC layer of a horizontal electric field-type LCD device in which a polymer network was formed using a +A-type reactive material were observed using a scanning electronic microscope (SEM), it could be confirmed that the polymer network was formed more effectively in the LC layer using the +A-type reactive material than in the LC layer using the +C-type reactive material.

Furthermore, it could be seen that the horizontal electric field-type LCD device in which the polymer network was formed using the +A-type reactive material as shown in FIGS. 6A through 6D had shorter response times than the horizontal electric field-type LCD device in which the polymer network was formed using the +C-type reactive material as shown in FIGS. 5A through 5D.

Accordingly, it can be inferred that as the polymer network is formed more effectively, a response time is shorter. In other words, it may be concluded that LC molecules are confined in multiple domains formed by the polymer network and the same effects may be produced as when a cell gap is substantially reduced.

In addition, when an LC layer of a horizontal electric field-type LCD device in which a reactive material was cured using UV light having a relatively high power density and an LC layer of a horizontal electric field-type LCD device in which a reactive material was cured using UV light having a relatively low power density were observed using an SEM, it could be confirmed that a polymer network was formed more effectively in the LC layer cured with the UV light having the relatively high power density than in the LC layer cured with the UV light having the relatively low power density.

Furthermore, in FIGS. 7A through 7D, it can be seen that the LC layer cured with the UV light having the relatively high power density had a shorter response time than the LC layer cured with the UV light having the relatively low power density.

Accordingly, it can be inferred that as the polymer network is formed more effectively, a response time is shorter. In other words, it can be concluded that that LC molecules are confined in multiple domains formed by the polymer network and the same effects may be produced as when a cell gap is substantially reduced.

Although an FFS-mode LCD device has been described above as an example of a horizontal electric field-type LCD device, the present invention can be applied likewise to an IPS-mode LCD device.

According to the present invention, a polymer network can be formed by curing a reactive material so that a response time and response speed of a horizontal electric field-type LCD device can be improved at room temperature and low temperatures.

It will be apparent to those skilled in the art that various modifications and variations can be made in a display device of the present disclosure without departing from the spirit or scope of the invention. Thus, it is intended that the present invention covers the modifications and variations of this invention provided they come within the scope of the appended claims and their equivalents.

What is claimed is:

1. A horizontal electric field-type liquid crystal display (LCD) device comprising:
    first and second substrates disposed opposite and apart from each other;
    a first electrode formed on an inner surface of the first substrate;
    a second electrode corresponding to the first electrode and configured to generate an electric field; and
    a liquid crystal (LC) layer formed between the first and second substrates, the LC layer including a polymer network and LC molecules confined in multiple domains by the polymer network,
    wherein the polymer network includes a reactive material, and
    wherein the reactive material has positive A (+A)-type refractive index characteristics of ($nx > ny = nz$) or positive C (+C)-type refractive index characteristics of ($nz > nx = ny$).

2. The LCD device of claim 1, wherein the reactive material is a reactive mesogen or a reactive monomer.

3. A method of fabricating a horizontal electric field-type liquid crystal display (LCD) device, the method comprising:
    forming a first electrode and a second electrode on a first substrate, the second electrode corresponding to the first electrode and configured to generate an electric field;
    bonding the first and second substrates to each other;
    forming a liquid crystal (LC) layer between the first and second substrates using a composition including an LC material and a reactive material; and
    forming a polymer network in the LC layer by curing the reactive material,
    wherein the reactive material has positive A (+A)-type refractive index characteristics of ($nx > ny = nz$) or positive C (+C)-type refractive index characteristics of ($nz > nx = ny$).

4. The method of claim 3, wherein the reactive material is contained at a content of about 0.1% or more by weight.

5. The method of claim 3, wherein the reactive material is a reactive mesogen or a reactive monomer.

6. The method of claim 3, wherein the forming of the polymer network comprises irradiating ultraviolet (UV) light to the reactive material.

7. The method of claim 6, wherein the UV light has a power density of about 1 mW/cm$^2$ or more.

8. The method of claim 3, wherein, during the forming of the polymer network, the same voltage is applied to the first and second electrodes, or the first and second electrodes are electrically floated so that a vertical electric field or a horizontal electric field is not applied to the liquid crystal layer.

* * * * *